United States Patent [19]

Hashimoto et al.

[11] Patent Number: 4,707,380
[45] Date of Patent: Nov. 17, 1987

[54] PROCESS FOR PREPARING A MAGNETIC RECORDING MEDIUM

[75] Inventors: Hiroshi Hashimoto; Tsutomu Okita; Yoshito Mukaida, all of Kanagawa, Japan

[73] Assignee: Fuji Photo Film Co., Ltd., Kanagawa, Japan

[21] Appl. No.: 875,259

[22] Filed: Jun. 17, 1986

Related U.S. Application Data

[63] Continuation of Ser. No. 697,820, Feb. 4, 1985, abandoned.

[51] Int. Cl.$^4$ ............................................. H01F 10/02
[52] U.S. Cl. ......................................... 427/40; 427/41; 427/44; 427/54.1; 427/129; 427/130; 427/131; 427/296; 427/316; 427/322
[58] Field of Search .................. 427/40, 127–132, 427/48, 41, 44, 54.1, 296, 316, 322

[56] References Cited

U.S. PATENT DOCUMENTS

| | | | |
|---|---|---|---|
| 4,071,654 | 1/1978 | Ogawa et al. | 427/129 |
| 4,468,412 | 8/1984 | Fujii et al. | 427/40 |
| 4,468,436 | 8/1984 | Okita et al. | 427/131 |

*Primary Examiner*—Bernard D. Pianalto
*Attorney, Agent, or Firm*—Sughrue, Mion, Zinn, Macpeak and Seas

[57] ABSTRACT

A process for preparing a magnetic recording medium is described, comprising subjecting a surface of a non-magnetic support having a surface roughness of not less than 0.01 μm to a non-contact surface treatment, providing a layer containing a compound polymerizable by radiation exposure on the surface of the support, exposing said layer to radiation, and then providing a magnetic layer on the radiation-exposed layer.

29 Claims, 1 Drawing Figure

U.S. Patent  Nov. 17, 1987  4,707,380
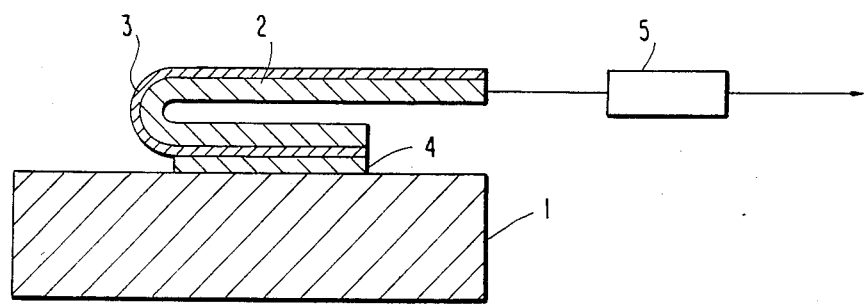

PROCESS FOR PREPARING A MAGNETIC RECORDING MEDIUM

This is a continuation of application Ser. No. 697,820, filed Feb. 4, 1985, now abandoned.

FIELD OF THE INVENTION

The present invention relates to a process for preparing a magnetic recording medium, more particularly, to a process for preparing a magnetic recording medium suitable for high density recording.

BACKGROUND OF THE INVENTION

It has been desired in magnetic recording media for high density recording that the surface properties of the magnetic layer be improved to reduce spacing loss between the medium and a magnetic head. For this purpose, not only do the surface properties of the magnetic layer have to be improved by improving the manufacturing technology of the magnetic layer but also the surface properties of the support have to be improved. It has been attempted to make the thickness of the magnetic layer thinner in order to reduce thickness loss because the recording wavelength is lessened with increased recording density. As a result, the surface properties of the magnetic layer are more affected by the surface properties of the support.

However, the following reasons limit improvements in the surface properties of a support which is used for magnetic recording media. That is, as the surface properties of a film used as a support for a magnetic layer become better, frictional resistance to traveling rolls increases, and, as a result, in winding the film on the traveling rolls, the film meanders or is wrinkled. Further, the film or web cannot be uniformly wound because frictional resistance between opposite surfaces of the film to be wound increases.

Accordingly, it is preferred in the film manufacturing step that the surface of the film have a surface roughness not less than 0.01 μm, but it is required, to provide a magnetic layer having better surface properties suitable for high density recording on a film support, that the surface of film have a surface roughness less than 0.01 μm.

Various approaches have been proposed to overcome these inconsistent factors. For example, it is suggested in Japanese Patent Application (OPI) No. 109605/78 (the term "OPI" as used herein refers to a "published unexamined Japanese patent application") that a magnetic layer be coated on a support on which fine protrusions of a thermoplastic resin have been provided and removed by dissolution with a solvent. However, according to this method, the characteristics necessary for magnetic recording media for high density recording cannot be attained.

Since a magnetic head for magnetic recording medium suitable for high density recording must have a very precise structure, even small amounts of dust deposited on a magnetic layer badly affects recording and replaying of the magnetic recording medium. Furthermore, with the tendency toward reducing the thickness of the magnetic layer to increase recording density, the magnetic layer is more easily stripped off from the support, particularly where adhesive properties between the support and the magnetic layer are insufficient. Material stripped from the magnetic layer tend to be deposited on the magnetic layer, and badly affect recording and replaying of the magnetic recording medium. Therefore, improvement of adhesive properties between the support and the magnetic layer has been desired for high density recording media.

To overcome the problems which have not been improved by conventional methods, it is proposed in Japanese Patent Application No. 187519/83 that an intermediate layer containing a compound polymerizable by exposure to radiation such as electron beams or ultraviolet rays be coated on a non-magnetic support having a surface roughness not less than 0.007 μm be exposed to radiation to polymerize and harden the same, and then a magnetic layer is coated on the intermediate layer.

The above problems are overcome by such a magnetic recording medium. That is, surface properties are improved because the coated intermediate layer is leveled before it is hardened by radiation exposure, and, therefore, the surface properties of the magnetic layer which is coated on the intermediate layer after the intermediate layer is hardened are also improved. Accordingly, even if a support having a surface roughness not less than 0.01 μm is used, a magnetic recording medium having better surface properties which is useful for high density recording can be obtained.

However, the adhesive property between the support and the magnetic layer is not completely satisfactory, while it may be improved in some extent by appropriate selection of materials for the intermediate layer.

SUMMARY OF THE INVENTION

Therefore, a first object of the invention is to provide a process for preparing a magnetic recording medium having a significantly improved adhesive property between a support and a magnetic layer.

A second object of the invention is to provide a process for preparing a magnetic recording medium having excellent surface properties.

A third object of the invention is to provide a process for preparing a magnetic recording medium for high density recording.

As a result of continued extensive research and development efforts, it has now been found that the adhesive property not only between the support and the intermediate layer, but also between the support and the magnetic layer, can be markedly improved, and that a magnetic layer having the same or improved smoothness compared to the magnetic layer under which the above described radiation exposed intermediate layer is provided, can be formed, by non-contact surface treatment of surface of the support.

The above objects of the invention can be attained by subjecting a surface of non-magnetic support having a surface roughness of not less than 0.01 μm to a non-contact surface treatment, providing a layer containing a compound polymerizable by radiation exposure on the surface of the support, exposing it to radiation, and then providing a magnetic layer on the radiation-exposed layer.

BRIEF DESCRIPTION OF THE DRAWING

FIGURE is an illustrative drawing for showing measurement of stripping strength of magnetic tapes prepared in the Examples.

DETAILED DESCRIPTION OF THE INVENTION

It is possible to use a non-magnetic support having opposite surfaces of different surface roughness, but more sophisticated processing is needed to prepare such a support, and preparation efficiency is low. Per this invention, a non-magnetic support having opposite surfaces of substantially the same surface roughness is thus preferably used, but a support used in the invention is not limited to such a support.

The non-magnetic support used in the invention includes polyesters (e.g., polyethylene terephthalate or polyethylene-2,6-naphthalate), polyolefins (e.g., polyethylene or polypropylene), celluose derivatives (e.g., cellulose triacetate, cellulose diacetate, cellulose acetate butyrate or cellulose acetate propionate), vinyl resins (e.g., polyvinyl chloride or polyvinylidene chloride), other plastics (e.g., polycarbonates, polyimides or polyimideamides), non-magnetic metals (e.g., aluminum, copper, tin, zinc, a non-magnetic alloy containing these metals or stainless steel), paper, baryta paper or paper coated or laminated with a polymer of α-olefins having 2 to 10 carbon atoms (e.g., polyethylene, polypropylene or ethylene-butene copolymers), etc.

Surface roughness in this invention means a center line average roughness as defined in JIS-B 0601, paragraph 5, and the cut-off value is 0.25 mm.

The surface roughness of support used in the invention is not less than 0.01 μm, and preferably 0.015 to 0.5 μm.

On the back surface of support used in the invention, a back coating layer can be provided to improve running properties. In this case, the surface roughness of the back coating layer is preferably not less than 0.01 μm, more preferably not less than 0.015 μm, to achieve the preferred effects of the invention.

The non-contact surface treatment in the invention includes surface treatment of ultraviolet ray exposure, glow discharge, corona discharge, flame exposure, electron beam exposure, etc., without surface treatment by mechanical means.

An ultraviolet ray having a wavelength of 220 to 370 nm can be used for ultraviolet ray exposure. A high pressure mercury lamp having a high extinction coefficient at the wavelengths of 254 nm, 313 nm, and 365 nm, at which a bright line spectrum is generated, can be used. A metal halide lamp can also be used for the purpose. The scale and the number of mercury lamps or metal halide lamps can be selected by the speed of treatment. The output of lamp is generally from 60 to 200 W/cm, preferably from 80 to 160 W/cm. The ultraviolet ray exposure can be provided on both surfaces of the support or the surface of the support to be coated with magnetic layer. In the ultraviolet ray exposure, the distance between the lamp and the support is generally from 1 to 100 cm, preferably from 10 to 50 cm and the exposure time is generally from 1 to 60 sec, preferably from 10 to 40 sec.

In a preferred embodiment of the invention, a surface of support to be treated is passed under high pressure mercury lamps, each having an effective arc length the same as the width of the support, which is usually from 30 cm to 1 meter. The mercury lamps are generally sequentially disposed at intervals of from 30 cm to 1 meter. If both surfaces of the support are to be treated, the support is passed between upper-disposed high pressure mercury lamps and under-disposed high pressure mercury lamps. If desired, the support can be heated to 100° to 200° C. when it is exposed.

In the glow discharge treatment, a support to be treated is placed between a pair of electrodes or is continuously moved between the electrodes. The electrodes are disposed in a vacuum chamber generally of from 0.01 to 20 Torr, preferably from 0.01 to 2 Torr, and generally voltage of from 500 to 5000 volts, preferably from 1000 to 3000 volts, with a discharge current of from 1 to 4 A is applied to the electrodes. The treatment is disclosed in British Pat. No. 891,469 and Japanese Patent Application (OPI) No. 13672/78.

A corona discharge treatment is a surface treatment using a corona discharge generated at a voltage generally of from 10 to 40 KV, preferably from 20 to 40 KV, and an electric current of from 3 to 20 mA, preferably from 3 to 10 mA, in a gas (generally air). The corona discharge treatment of the invention can include a flash discharge as disclosed in Japanese Patent Application (OPI) No. 28067/73. A support continuously moved on an electroconductive roll such as a metal roll (earth side) can be treated with a corona discharge which is generated between the roll and a corona electrode provided parallel to the roll. Alternatively, discharge generated between a first electrode, a roll and a second electrode can be used wherein the two parallel electrodes are disposed parallel to the roll and a high electric volutage is applied to the electrodes. In either case, the surface of support which is not supported on the roll, that is, which faces toward the electrodes, is treated.

In the flame treatment, a surface of continuously moving support is exposed to flame which is generated by burning a mixture of oxygen and a hydrocarbon gas e.g., a paraffinic hydrocarbon gas an olefinic hydrocarbon gas. The speed of the flame treatment is generally from 50 to 800 m/min, preferably from 100 to 500 m/min. The speed of treatment can be varied according to the distance or angle between the flame and the support to be treated. The distance is generally from 1 to 20 cm, preferably from 2 to 10 cm, and the angle is generally from 70° to 110°, preferably from 80° to 100°, more preferably 90°. In the flame treatment one or both surfaces of the support can be treated. Also, one surface of the support can be treated while the other surface of the support is cooled with a cooling roll, etc. Examples of flame treatment are disclosed in British Pat. No. 788,365, U.S. Pat. No. 3,072,483, and Japanese Patent Application (OPI) No. 113,578/75.

In the electron beam exposure according to this invention, the whole surface of a support is exposed to an electron beam generally having an accelerating voltage of from 10 to 300 KV, preferably from 50 to 200 KV, and an absorption amount of from 1 to 10 Mrad, preferably from 1 to 5 Mrad, by using an electron beam accelerator which is used for electron beam exposure of the intermediate layer as described below.

On the surface of the support which is subjected to non-contact surface treatment of the present invention, a layer containing a compound polymerizable by radiation exposure as an intermediate layer is coated.

The compound polymerizable by radiation exposure employed in the intermediate layer is a compound having at least one carbon-carbon unsaturated bond, preferably up to 10 carbon-carbon unsaturated bonds, in its molecule. Typical examples of the compounds are acrylates, acrylamides, methacrylates, methacrylamides, allyl compounds, vinyl ethers, vinyl esters, vinyl heterocyclic compounds, N-vinyl compounds, styrenes, crotonic acids, itaconic acids and olefins. More preferred compounds have 2 or more, preferably 2 to 4, acryloyl and/or methacryloyl groups per molecule, and include acrylates such as diethylene glycol diacrylate, triethylene glycol diacrylate, tetraethylene glycol diacrylate, trimethylolpropane triacrylate or pentaerythritol tetraacrylate; methacrylates such as diethylene glycol dimethacrylate, triethylene glycol trimethacrylate, tetraethylene glycol dimethacrylate, trimethylolpropane trimethacrylate or pentaerythritol tetramethacrylate; and other esters of acrylic acids or methacrylic acids with polyols, having 2 or more, preferably up to 10, functional groups such as acryloyl group and methacryloyl group per molecule.

These compounds can be high molecular weight compounds, and preferably are compounds having an acrylic acid ester bond or a methacrylic acid ester bond in the ends of their molecular chain or in a side chain, which are disclosed in A. Vranckem, *Fatipec Congress*, 11, 19 (1972). An example of such compounds is represented by the formula:

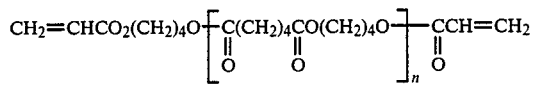

wherein $0 \leq n \leq 100$. In the formula, the polyester structure can be replaced by polyurethane structure, epoxy resin structure, polyether structure, polycarbonate structure or a mixture thereof. The molecular weight of the compound represented by the formula is 1,000 to 20,000, but it is not limited to such values.

The compounds polymerizable by radiation exposure can be used alone or in combination at any mixing ratio.

Further, thermoplastic resins generally having a molecular weight of 5,000 to 100,000, such as vinyl chloride-vinylidene chloride resins, urethane resins, acrylonitrile-butadiene resins, vinyl chloride-vinyl acetate resins, cellulose resins or acetal resins, can be used with the compound polymerizable by radiation exposure, if desired or necessary. The amount of thermoplastic resin is generally not more than 50% by weight, preferably not more than 30% by weight, based on the weight of the compound polymerizable by radiation exposure.

The radiation employed in this invention is electron beam or ultraviolet radiation.

Where ultraviolet radiation is used, it is preferred that a photopolymerization initiator be added to the compound polymerizable by radiation exposure. The photopolymerization initiator is not limited to specific examples, but initiators having a high extinction coefficient at wavelengths of 254 nm, 313 nm and 365 nm, at which a bright line spectrum is generated by a mercury lamp conventionally used as a light source for ultraviolet radiation is preferably used.

Typical examples of initiators are aromatic ketones such as acetophenone, benzophenone, benzoinethyl ether, benzyldimethyl ketal, benzylidiethyl ketal, benzoin isobutyl ketone, hydroxydimethylphenyl ketone, 1-hydroxy-cyclohexyl phenyl ketone, 2,2-diethoxyacetophenone or Michler's ketone.

The amount of the photopolymerization initiator is generally 0.5 to 20 parts by weight, preferably 2 to 15 parts by weight, more preferably 3 to 10 parts by weight, based on 100 parts by weight of the compound polymerizable by radiation.

When the intermediate layer is coated on the support, various solvents can be used; however, if the compound polymerizable by radiation exposure is a liquid, no solvent need be present. As examples of the solvents, there are ketones such as acetone, methyl ethyl ketone, methyl isobutyl ketone or cyclohexanone; alcohols such as methyl alcohol, ethyl alcohol, propyl alcohol or butyl alcohol; esters such as methyl acetate, ethyl acetate, butyl acetate, ethyl lactate or glycol acetate monoethyl ether; glycol ethers such as ether, glycol dimethyl ether, glycol monoethyl ether or dioxane; aromatic hydrocarbons such as benzene, toluene or xylene; chlorinated hydrocarbons such as methylene chloride, ethylene chloride, carbon tetrachloride, chloroform, ethylene chlorohydrin or dichlorobenzene, etc.

The thickness of the intermediate layer (which is measured after it is polymerized and hardened by radiation exposure) is generally 0.1 to 2 μm and preferably 0.5 to 1.5 μm. The surface roughness of the intermediate layer is preferably less than 0.01 μm. To obtain the desired intermediate layer, it is effective that the viscosity of the coating composition for the intermediate layer be kept low, preferably within the range of from 1 to 1,000 cps, more preferably from 5 to 500 cps (25° C.), that is, a leveling effect is achieved by adding a low viscosity compound or an organic solvent to the composition.

For ultraviolet radiation, a high pressure mercury lamp having an output of about 80 W/cm is generally used. Upon the radiation it is preferred that the temperature of the support be kept below 100° C. so as to prevent thermal deformation of the support by, e.g., using an infrared filter or a cooling apparatus.

An electron beam accelerator is generally used for electron beam irradiation, e.g., a scanning method, a double scanning method or a curtain beam method can be used. Particularly, the curtain beam method is preferred because it provides large power at low cost. The acceleration voltage of the accelerator is 10 to 1,000 kV, preferably 50 to 300 kV, and the absorption amount of the electron beams is generally 0.5 to 20 Mrad, preferably 1 to 10 Mrad. When the acceleration voltage is not more than 10 kV, the amount of energy transmitted is insufficient, while when it is more than 1,000 kV, the energy efficiency for the polymerization is reduced and such is not economical. When the absorption amount is not more than 0.5 Mrad, the hardening reaction insufficiently proceeds while when it is more than 20 Mrad, the energy efficiency for hardening is reduced, materials exposed generate heat and plastic supports are deformed.

The magnetic layer(s) provided on the polymerization hardened layer of the invention can be composed of ferromagnetic particles and a binder as main components or composed of a ferromagnetic thin metal film.

The ferromagnetic thin metal film is generally prepared in a vacuum chamber or by plating a metal on the intermediate layer. The vacuum chamber is more preferred because the speed of forming the thin metal film is high, preparation steps are simple and no waste liquid treatment is needed. Methods for forming the thin films also include depositing a vapor of a substance or compound in a vacuum chamber or in a dilute gas on the intermediate layer, such as sputtering, ion plating or chemical gas plating.

Ferromagnetic metals for the magnetic thin film include, e.g., iron, cobalt, nickel or an alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, Co-Sm-Cu, etc.

The thickness of the magnetic metal film is generally 0.05 to 2 μm, preferably 0.1 to 0.4 μm.

Useful ferromagnetic powders, additives, organic solvents and methods for preparing magnetic recording media including dispersing methods and coating methods are disclosed in U.S. Pat. Nos. 4,135,016 and 4,205,353 and Japanese Patent Application (OPI) No. 46011/79.

The present invention will be explained in more detail by the following Examples. In the Examples, all "parts" refer to "parts by weight".

Also in the Examples, the adhesive property between the support and the magnetic layer was measured by the following test of stripping strength.

FIG. 1 is an illustrative drawing for showing measurement of stripping strength of magnetic tapes, in which a magnetic layer 3 of magnetic tape 2 is adhered to a glass plate 1 by a two sided adhesive tape 4, and a spring balance 5 is connected to the opposite end of the magnetic tape 2. The adhesive property was indicated in terms of spring balance pull when the magnetic layer is stripped off by pulling the spring balance 5 in the arrow direction. In the test, magnetic tape having a width of 1.26 cm and a length of 5 cm was used, and the length of magnetic tape adhered to the glass plate 1 was 2 cm.

EXAMPLE 1

A surface of polyethylene terephthalate film having a surface roughness of 0.015 μm and a thickness of 14.5 μm was exposed to ultraviolet rays for 30 seconds by a 80 W/cm high pressure mercury lamp using a quartz tube having a length of 30 cm in a distance of 20 cm from the surface of polyethylene terephthalate film. On the treated surface of support, diethylene glycol diacrylate was coated, and an electron beam radiation was provided at an accelerating voltage of 165 KV, an electric beam current of 5 mA and an absorption amount of 5 Mrad. The thickness of the intermediate layer was 0.5 μm.

A magnetic coating composition having the following formula was kneaded for 10 hours by a ball mill.

| | |
|---|---|
| Co—containing γ-$Fe_2O_3$ (Hc 630 Oe; particle size 0.4 μm × 0.05 μm × 0.05 μm) | 300 parts |
| Polyester polyurethane (ethylene adipate-2,4-tolylenediisocyanate reaction product; average molecular weight based on styrene about 130,000) | 35 parts |
| Vinyl chloride-vinyl acetate-maleic anhydride copolymer (content of maleic acid 3.0 wt %; polymerization degree about 400) | 30 parts |
| Dimethyl polysiloxane (polymerization degree about 60) | 2 parts |
| Butyl acetate | 300 parts |
| Methyl isobutyl ketone | 300 parts |

After dispersing the composition, 22 parts of 75 wt % ethyl acetate solution of trimethylolpropane adduct of triisocyanate compound (molecular weight: about 760, content of NCO: 13.3 wt %, trade name: "Dismodule L-75" manufactured by Bayer A.G.) was added and dispersed for 1 hour by high speed sharing force to provide a magnetic coating composition. Thus prepared coating composition was coated in a dry thickness of 4 μm on the intermediate layer. The magnetic layer was subjected to orientating treatment under a direct current magnetic field, and then was dried with an air current heated to 100° C. After drying, the magnetic layer was calendered and slit into a ½ inch width to obtain Sample No. 1 for magnetic video tape.

COMPARATIVE EXAMPLE 1

The same procedure as in Example 1 was repeated, except that the support was not exposed to ultraviolet rays, to obtain Sample No. 2.

COMPARATIVE EXAMPLE 2

The same procedure as in Example 1 was repeated, except that the support was not exposed to ultraviolet rays and the intermediate layer was not provided, to obtain Sample No. 3.

EXAMPLE 2

The same procedure as in Example 1 was repeated, except that a polyethylene terephthalate film having surface roughness of 0.030 μm was used, to obtain Sample No. 4.

COMPARATIVE EXAMPLE 3

The same procedure as in Example 2 was repeated, except that the polyethylene terephthalate film was not exposed to ultraviolet rays, to obtain Sample No. 5.

COMPARATIVE EXAMPLE 4

The same procedure as in Example 2 was repeated, except that the polyethylene terephthalate film was not exposed to ultraviolet rays, and an intermediate layer was not provided, to obtain Sample No. 6.

The adhesive property (stripping test) between the magnetic layer and the support, video sensitivity, and C/N of these Samples were measured as follows, and the results are shown in Table 1.

Video sensitivity: The reproduced output at 4 MHz was measured by VHS type VTR (video tape recorder trade marked "NV-8800", manufactured by Matsushita Electric Industries Co., Ltd.) and was shown by relative value to the output in Comparative Example 2 (Sample No. 3).

C/N (carrier/noise ratio): A 3.5 MHz carrier was recorded on Samples and reproduced, and the ratio of the reproduced carrier to noise (S/N ratio) was measured and shown as relative value with respect to the ratio for Comparative Example 2 (Sample No. 3).

TABLE 1

| Sample No. | U.V. exposure | Intermediate layer | C/N (dB) | Video sensitivity | Stripping test |
|---|---|---|---|---|---|
| 1 | conducted | presence | +1.5 | +1.2 | 180 g (magnetic layer was destroyed) |
| 2 | none | presence | +1.5 | +1.2 | 30 g (interface of support and intermediate layer was stripped) |
| 3 | none | none | 0 | 0 | 20 g (interface of base |

TABLE 1-continued

| Sample No. | U.V. exposure | Intermediate layer | C/N (dB) | Video sensitivity | Stripping test |
|---|---|---|---|---|---|
| | | | | | and support was stripped) |
| 4 | conducted | presence | +0.7 | +0.2 | 195 g (same as No. 1) |
| 5 | none | presence | +0.7 | +0.1 | 50 g (same as No. 2) |
| 6 | none | none | −1.8 | −2.1 | 32 g (same as No. 3) |

As is apparent from Table 1, Sample Nos. 1 and 4, which were prepared by subjecting the surface of the support to ultraviolet ray exposure, coating the intermediate layer, subjecting it to electron beam exposure and coating the magnetic layer, provide significantly improved adhesive properties between the support and the intermediate layer and between the intermediate layer and the magnetic layer. Sample Nos. 2 and 5, which were prepared by providing the intermediate layer without ultraviolet ray exposure, provide an adhesive property such that the interface between the magnetic layer and the intermediate layer was stripped by comparatively small strength.

The video sensitivity and the C/N ratio of magnetic tapes of this invention (Sample Nos. 1 and 4) were same as or better than those of magnetic tapes which were prepared by providing an electron beam-exposed intermediate layer without exposing the support to ultraviolet rays, and were much better than those of magnetic tapes having no intermediate layer.

EXAMPLE 3

The same procedure as in Example 1 was repeated, except that a corona discharge treatment (35 KV, 8 mA) was carried out instead of the ultraviolet ray exposure, to obtain magnetic tape having a stripping strength of 200 g and the same video sensitivity and C/N ratio as those of Sample No. 1 (Example 1).

EXAMPLE 4

The same procedure as in Example 1 was repeated, except that a glow discharging treatment (3000 V) in a vacuum of 0.1 Torr was carried out instead of the ultraviolet ray exposure, to obtain magnetic tape having a stripping strength of 175 g and the same video sensitivity and C/N ratio as those of Sample No. 1 (Example 1).

EXAMPLE 5

The same procedure as in Example 1 was repeated, except that an electron beam was applied in an absorption amount of 1 Mrad at an accelerating electric voltage of 150 KV instead of the ultraviolet ray exposure, to obtain magnetic tape having a stripping strength of 180 g and the same video sensitivity and C/N ratio as those of Sample No. 1 (Example 1).

EXAMPLE 6

The same procedure as in Example 1 was repeated, except that the following flame treatment was carried out instead of the ultraviolet ray exposure. That is, a flame generated by burning a gas mixture of 0.9 kg/hr of propane and 2.1 kg/hr of oxygen by a gas burner was vertically applied to a continuously moving support at a moving speed of 100 m/min at a distance of 3 cm from the flame. The thus obtained magnetic tape had a stripping strength of 170 g and the same video sensitivity and C/N ratio as those of Sample No. 1 (Example 1).

While the invention has been described in detail and with reference to specific embodiments thereof, it will be apparent to one skilled in the art that various changes and modifications can be made therein without departing from the spirit and scope thereof.

What is claimed is:

1. A process for preparing a magnetic recording medium comprising subjecting a surface of a non-magnetic support having a surface roughness of no less than 0.01 μm to a non-contact surface treatment, providing an intermediate layer containing a compound polymerizable by electron beam or ultraviolet radiation exposure on the surface of the support, wherein the intermediate layer is provided by coating a composition containing said compound polymerizable by electron beam or ultraviolet radiation exposure and having a viscosity of from 1 to 1,000 cps, exposing said intermediate layer to electron beam or ultraviolet radiation, and then providing a magnetic layer on the radiation-exposed intermediate layer, wherein said magnetic layer comprises ferromagnetic particles and a binder, further wherein at least the surface of the support which is subjected to non-contact surface treatment is the surface on which the intermediate layer containing the compound polymerizable by electron beam or ultraviolet radiation exposure is formed, wherein said composition provides a leveling effect before hardening by radiation exposure.

2. A process as in claim 1, wherein said non-contact surface treatment is an ultraviolet ray exposure surface treatment.

3. A process as in claim 1, wherein said non-contact surface treatment is a glow discharge surface treatment.

4. A process as in claim 1, wherein said non-contact surface treatment is a corona discharge surface treatment.

5. A process as in claim 1, wherein said non-contact surface treatment is a flame surface treatment.

6. A process as in claim 1, wherein said non-contact surface treatment is an electron beam exposure surface treatment.

7. A process as in claim 1, wherein the surface of said non-magnetic support has a surface roughness of 0.015 to 0.5 μm.

8. A process as in claim 2, wherein the surface of said non-magnetic support has a surface roughness of 0.015 to 0.5 μm.

9. A process as in claim 3, wherein the surface of said non-magnetic support has a surface roughness of 0.015 to 0.5 μm.

10. A process as in claim 4, wherein the surface of said non-magnetic support has a surface roughness of 0.015 to 0.5 μm.

11. A process as in claim 5, wherein the surface of said non-magnetic support has a surface roughness of 0.015 to 0.5 μm.

12. A process as in claim 6, wherein the surface of said non-magnetic support has a surface roughness of 0.015 to 0.5 μm.

13. A process as in claim 2, wherein said ultraviolet ray exposure is conducted using one or more high pressure mercury lamps.

14. A process as in claim 8, wherein said ultraviolet ray exposure is conducted using one or more high pressure mercury lamps.

15. A process as in claim 3, wherein said glow discharge is conducted by placing the support between a pair of electrodes in a vacuum chamber of from 0.01 to 20 Torr and applying a voltage of from 500 to 5,000 volts.

16. A process as in claim 9, wherein said glow discharge is conducted by placing the support between a pair of electrodes in a vacuum chamber of from 0.01 to 20 Torr and applying a voltage of from 500 to 5,000 volts.

17. A process as in claim 4, wherein said corona discharge is generated by a voltage of from 10 to 40 KV in a gas.

18. A process as in claim 10, wherein said corona discharge is generated by a voltage of from 10 to 40 KV in a gas.

19. A process as in claim 5, wherein said flame surface treatment is conducted by continuously moving the support at a speed of from 50 m/min to 800 m/min while exposing the support to a flame generated by burning a mixture of oxygen and a hydrocarbon gas.

20. A process as in claim 11, wherein said flame surface treatment is conducted by continuously moving the support at a speed of from 50 m/min to 800 m/min while exposing the support to a flame generated by burning a mixture of oxygen and a hydrocarbon gas.

21. A process as in claim 6, wherein said electron beam exposure is conducted at an accelerating voltage of from 10 to 300 KV to provide an absorption amount of from 1 to 10 Mrad using an electron beam accelerator.

22. A process as in claim 12, wherein said electron beam exposure is conducted at an accelerating voltage of from 10 to 300 KV to provide an absorption amount of from 1 to 10 Mrad using an electron beam accelerator.

23. A process as in claim 1, wherein the intermediate layer has a surface roughness of less than 0.01 $\mu$m.

24. A process as in claim 1, wherein said non-magnetic support is a polyethylene terephthalate film.

25. A process as in claim 1, wherein the viscosity is from 5 to 500 cps.

26. A process as in claim 1, wherein said non-contact surface treatment is selected from the group consisting of ultraviolet ray exposure, glow discharge, corona discharge, flame exposure and electron beam exposure.

27. A process as in claim 26, wherein said polymerizable compound is a compound having 1 to 10 carbon-carbon unsaturated bonds in its molecule.

28. A process as in claim 27, wherein said polymerizable compound is selected from the group consisting of acrylates, acrylamides, methacrylates, methacrylamides, allyl compounds, vinyl ethers, vinyl esters, vinyl heterocyclic compounds, N-vinyl compounds, styrenes, crotonic acids, itaconic acids and olefins.

29. A process as in claim 28, wherein said polymerizable compound is a compound having 2 or more acryloyl and/or methacryloyl groups per molecule.

* * * * *